(12) United States Patent
Specht

(10) Patent No.: US 6,241,282 B1
(45) Date of Patent: Jun. 5, 2001

(54) AIRBAG

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/295,627

(22) Filed: Apr. 20, 1999

(30) Foreign Application Priority Data

Apr. 29, 1998 (DE) .............................................. 198 19 206

(51) Int. Cl.$^7$ .................................................. B60R 21/16
(52) U.S. Cl. ........................................................ 280/743.1
(58) Field of Search ........................................ 280/743.1

(56) References Cited

U.S. PATENT DOCUMENTS

| | | | |
|---|---|---|---|
| 3,736,004 | 5/1973 | Haruna | 280/733 |
| 5,140,799 | * 8/1992 | Satoh | 53/429 |
| 5,335,936 | 8/1994 | Faigle et al. | 280/728.2 |
| 5,398,968 | * 3/1995 | Emambakhsh et al. | 280/743.1 |
| 5,425,551 | 6/1995 | Hawthorn | 280/743.1 |
| 5,531,476 | * 7/1996 | Kerner | 280/743.1 |
| 5,605,350 | 2/1997 | Bates et al. | 280/743.1 |
| 5,636,861 | 6/1997 | Orsulak et al. | 280/730.1 |
| 5,746,447 | * 5/1998 | Dyer et al. | 280/743.2 |
| 6,007,092 | 12/1999 | Martz | 280/733 |

FOREIGN PATENT DOCUMENTS

| | | |
|---|---|---|
| 19611384 | 9/1997 | (DE) . |
| 19704684 | 8/1998 | (DE) . |
| 19707997 | 9/1998 | (DE) . |

* cited by examiner

Primary Examiner—Paul N. Dickson
Assistant Examiner—Faye M. Fleming
(74) Attorney, Agent, or Firm—Lonnie Drayer

(57) ABSTRACT

An airbag, in particular a passenger airbag, is folded in the resting state and is fastened on a fixing device. The airbag is folded double with crossover folds so that a passage for one or more substantially rectilinearly extending measuring elements is formed in the interior of the folded airbag.

11 Claims, 5 Drawing Sheets

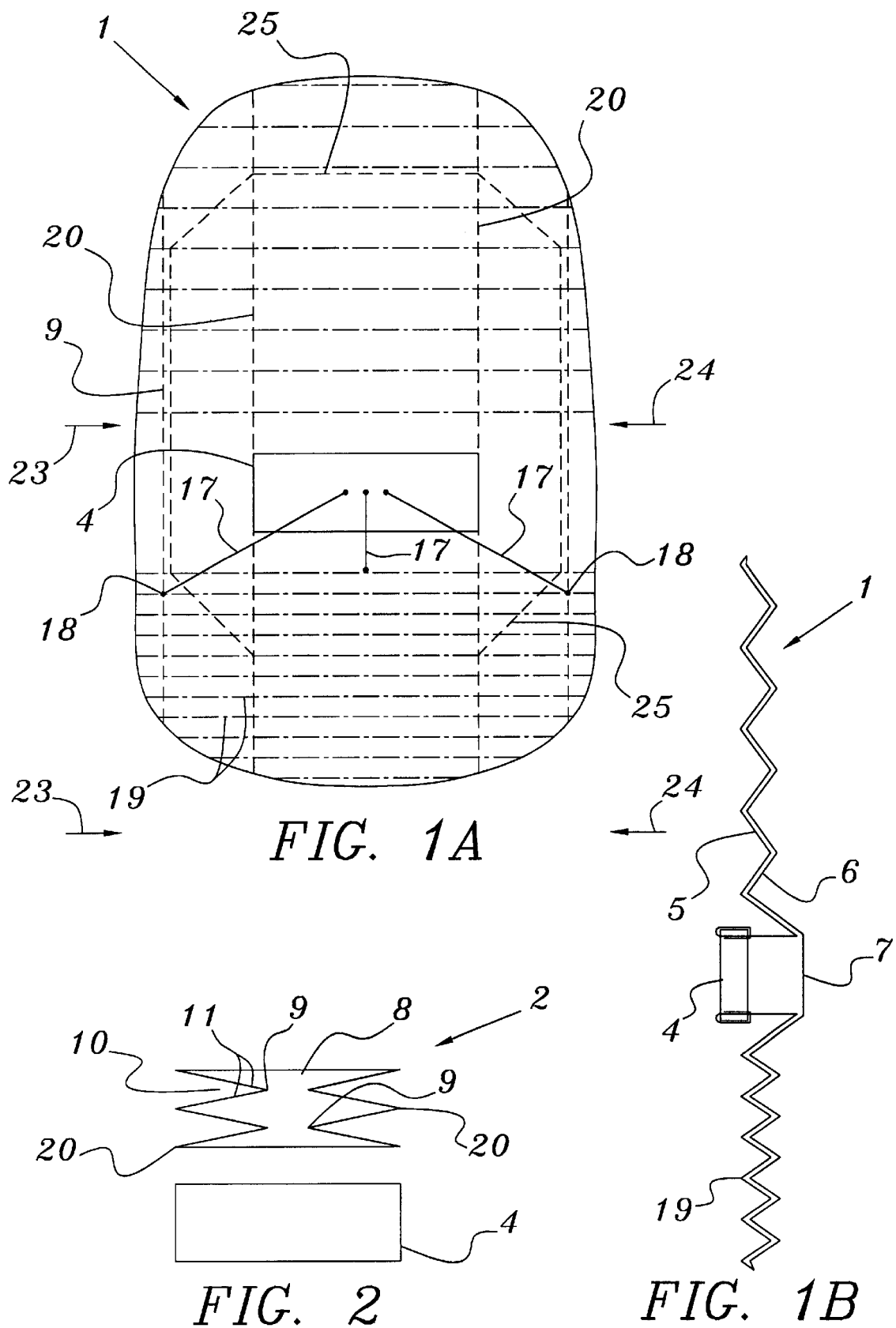

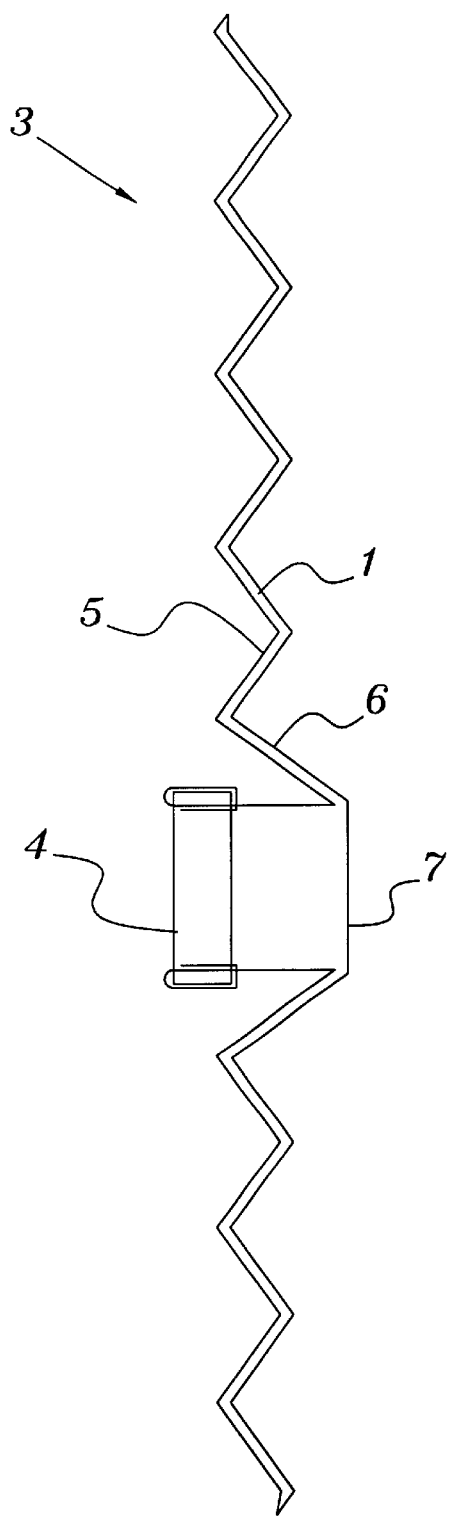
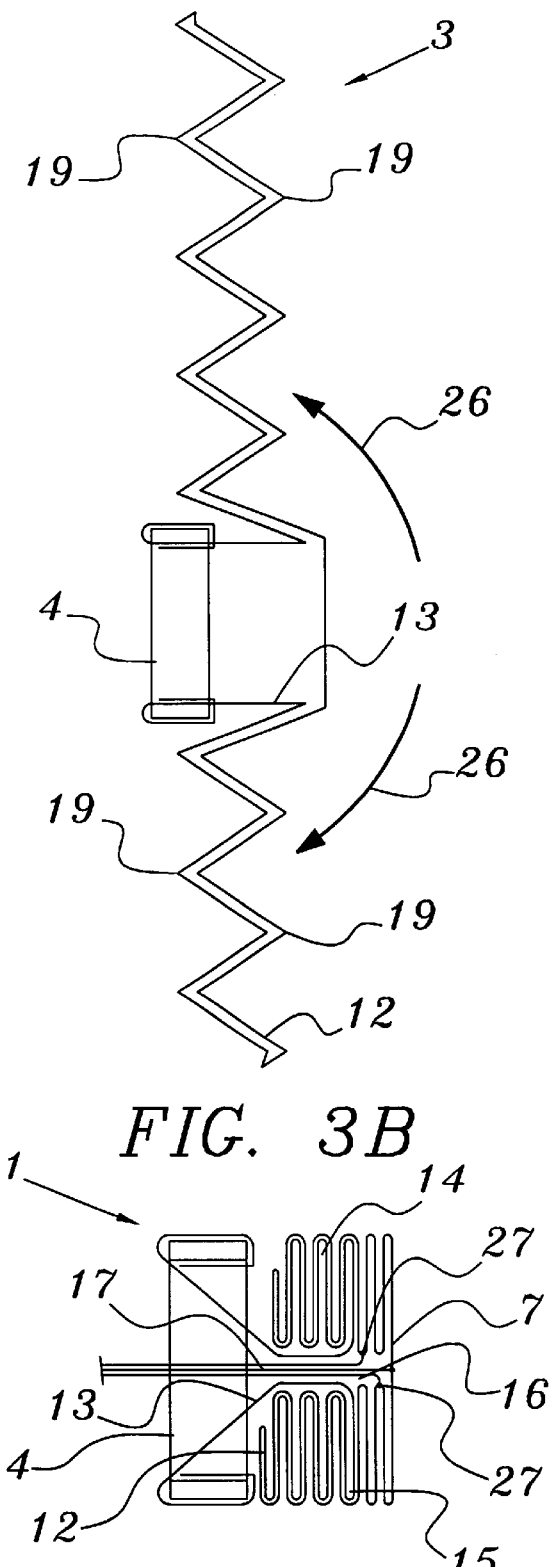
FIG. 3A  FIG. 3B  FIG. 3C

AIRBAG

FIELD OF THE INVENTION

The invention relates to an airbag, in particular a passenger airbag, comprising an airbag which is folded in the resting state and which is fastened on a fixing device.

DISCUSSION OF THE PRIOR ART

An airbag of this type is described, for example, in DE 197 04 684 A1. DE 196 11 384 A1 also discloses an airbag device in which the respective situation existing on the passenger side of the vehicle interior in the filling volume region of the airbag during the inflation process is taken into account. It is taken into consideration that, within a very short period of time, a large filling volume is blown into the gas cushion in an average filling time of about 35 milliseconds. With the known airbag device, the airbag is filled until an article impedes the advance movement during the advance movement. The advance movement can be monitored by means of an advance movement scanner provided in the interior of the airbag.

SUMMARY OF THE INVENTION

It is an object of the invention to provide an airbag of the type mentioned at the outset with which an advance movement scanner is anchored on the interior of the airbag without impairing the unfolding behavior of the airbag and the accuracy of measurement of the advance movement scanner.

This object is achieved by special folding of the airbag in that the airbag is folded double with crossover folds, the two crossover sets of folds being orientated substantially mutually perpendicularly with the lays of their folds. The arrangement and dimensioning of the lays of the folds of the two crossover sets of folds is such that a free space is, or can be, created in the interior of the airbag. Preferably rectilinearly extending scanning elements or measuring elements extend through the interior of the airbag to measure of the advance movement of the airbag as it is unfolded, so the airbag can be guided up to the front or top of the folded airbag package.

Rectilinearly extending elongate measuring elements extended, or straightend, during unfolding of the gas cushion, for example measuring threads, measuring strips or other suitable traction means, by which the movement of the front surface of the airbag into the passenger space can be scanned and measured, are suitable for scanning or measuring the length of advance movement. A device for evaluating the, in particular, unimpeded advance movement of the airbag is known from DE 196 11 384 A1 or described in DE 197 07 997 A1. For example, a sequence of pulses can be generated which depends on the advance movement of the unfolding airbag. To this end, a measuring or scanning element or a plurality of measuring or scanning elements can be connected to the front panel of the airbag.

The special folding also ensures that, during inflation, the airbag is rapidly unfolded from its folded state and substantially assumes the contour which is preset by its lower part connected to the fixing device and its upper part comprising the front surface. The lower and upper parts are mutually connected by a peripheral seam.

As a result of the folding, a compact airbag package can be achieved which corresponds substantially to the dimensions of the fixing device in base cross-section. The fixing device can be designed as a fixing frame that surrounds the inflation orifice for the filling gas into the interior of the airbag. The folded airbag package can also be arranged with a receiving compartment optionally equipped with a reinforcing trough (DE 197 04 684 A1). The airbag is connected to the vehicle body by the fixing device.

Preferably, the first set of folds of the airbag forms a bellows in which lays of the folds are orientated toward one another on two sides of the airbag. The lays of the folds are formed in each case by two fold flanks converging in an internal fold line. The second set of folds can be a zigzag set of folds in which the bellows formed by the first set of folds is folded in a zigzag form with superimposed fold flanks. Preferably, the second set of folds ends at the lateral boundary of the fixing device.

The stack of folds of the airbag produced by the second set of folds is preferably arranged between the fixing device, in particular the fixing frame, and the upper surface of the folded airbag. A piece of fabric forming the upper surface of the folded airbag is part of the upper part of the airbag and is located in the front panel of the airbag which moves into the passenger space on inflation. As the second set of folds ends at the lateral boundaries of the fixing device or in the vicinity thereof, there remains a region of the airbag with a span which corresponds substantially to the base surface of the fixing device and comprises only the first set of folds. This region of the airbag lies directly below the piece of fabric forming the upper surface and above the doubly folded stack. The anchoring of the scanning or measuring elements, in particular measuring threads, to the front panel of the airbag depends on the configuration of the airbag that is predetermined as a function of the type of vehicle. Anchoring is effected in such a way that, particularly when a passenger is out-of-position, parts of the passenger's body or articles can be sensed, and the filling of the airbag is controlled accordingly, as described in DE 196 11 384 A1 or DE 197 04 684 A1.

The various fold lays of the folded airbag can also be connected by tear seams, in particular in the region of their fold lines, in order to achieve intentional unfolding behavior during inflation of the airbag.

BRIEF DESCRIPTION OF THE DRAWINGS

Embodiments of the invention will be described in more detail with reference to the figures, in which:

FIG. 1 is a plan view in illustration (A) and a side view in illustration (B) of an unfolded airbag of an airbag with fold lines sketched in dash and dot-dash form;

FIG. 2 is a schematic view of a first set of folds for producing a folded airbag;

FIG. 3 shows, in illustration (A), an initial state of the second set of folds extending perpendicularly to the first set of folds shown in FIG. 2, in illustration (B) the second set of folds in an intermediate state and, in illustration (C), the complete second set of folds with final stack of folds of the airbag;

DETAILED DESCRIPTION OF THE INVENTION

Figure 4A:
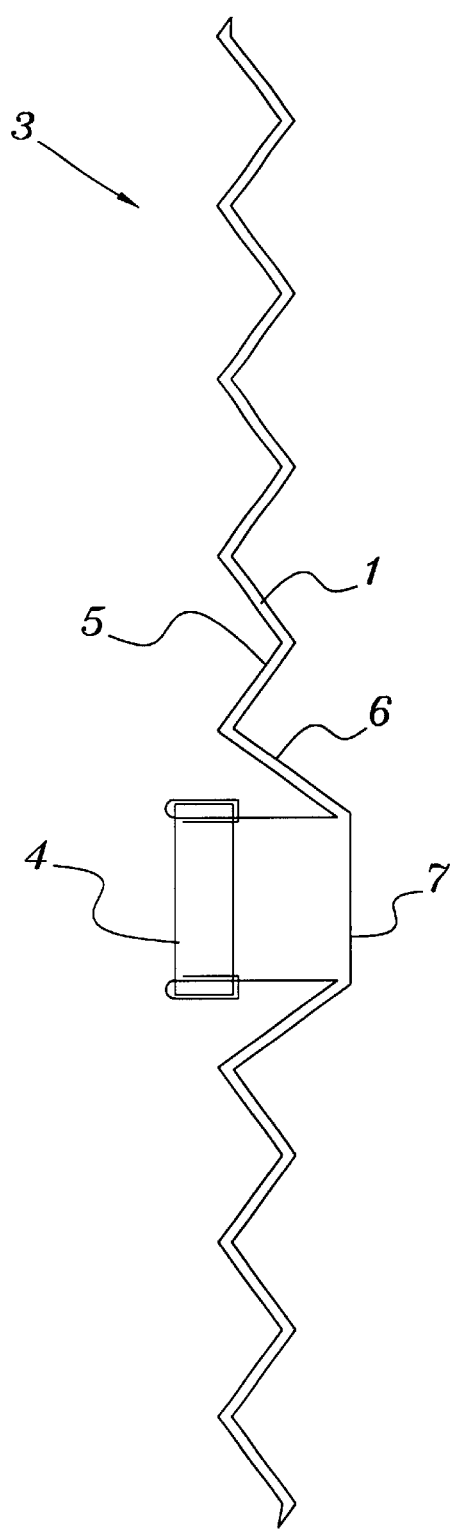
FIG. 4 shows the same illustrations (A), (B) and (C) as in FIG. 3 of a further embodiment.

FIG. 1(A) is a plan view of a airbag 1 of the type used, for example, for a passenger airbag. Illustration (B) is a side view of the airbag 1 indicating fold lays of a second set of folds 3 which will be described in more detail with reference to FIGS. 3 and 4. Fold lines 19 of the second set of folds 3 are shown in dot-dash form in illustration (A). Fold lines 9 and 20 of a first set of folds 2 extending perpendicularly thereto (FIG. 2) are shown in dash form. The fold lines 9 form internal fold lines and the fold lines 20 form external fold lines of the first set of folds 2, as shown in particular in FIG. 2. The airbag 1 comprises an airbag lower part 5 connected to a fixing device designed as a fixing frame 4 and an airbag upper part 6 which substantially represents the front surface of the airbag 1 when it is unfolded into the passenger space. As used herein and in the claims the terms "front surface" and "front panel" of the airbag is understood to mean the surface or panel of the airbag that is intended to contact a vehicle occupant when the airbag is deployed in a crash. The upper and lower parts of the airbag can be mutually connected by a peripheral seam.

The airbag shown in the figures is an embodiment that is suitable for a passenger airbag. A region of the airbag shown above the fixing frame 4 in the figures is located, in the deflated state (FIG. 6), between dashboard 22 and a windscreen 21 of the motor vehicle and rests on the windscreen 21. The region of the airbag shown beneath the fixing frame 4 in the figures extends substantially in front of the dashboard 22 of the motor vehicle in the inflated state. In the embodiment illustrated, the upper region of the airbag 1 located between the dashboard 22 and the windscreen 21 in the inflated state has a larger filling volume than the lower region.

Figure 4B:
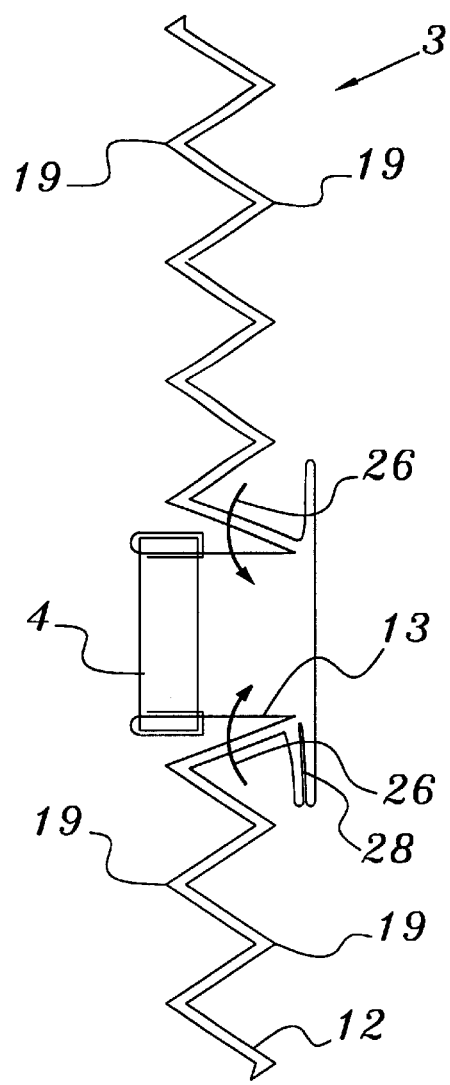
Figure 4C:
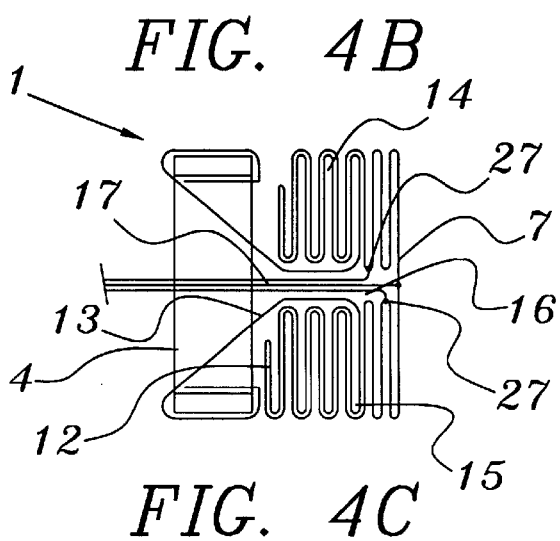

In the folded state (FIGS. 3(C) and 4(C)), the airbag 1 is folded with the two crossover sets of folds 2 and 3. The first set of folds 2 is shown schematically in FIG. 2. A bellows 8 is formed by this set of folds. Folding is carried out from the right and from the left in the direction of the mutually facing arrows 23 and 24 in FIGS. 1(A) and 2. These folding directions (arrows 23 and 24) extend transversely to the vertical span of the airbag 1 with respect to its arrangement in the motor vehicle. The first set of folds 2 includes fold lays 10 comprising two converging fold flanks 11. The fold flanks 11 converge in internal fold lines 9 and issue from external fold lines 20. The fold lays 10 are directed toward one another according to the opposing fold directions (arrows 23 and 24). In the embodiment illustrated, the fold lays 10 of the first set of folds 2 are so dimensioned that the external fold lines 20 are substantially aligned with the external edges of the fixing frame 4, as shown schematically in FIG. 2.

The airbag 1 shaped in this way in the form of a bellows 8 is provided with the second set of folds 3 extending perpendicularly thereto. As shown in particular in FIGS. 3 and 4, the set of folds 3 has a zigzag form. The second set of folds 3 is impressed upon the airbag 1 that is folded in the form of a bellows 8. The fold lays formed between the fold lines 19 of the second set of folds 3 are superimposed and arranged between the fixing frame 4 and a piece of fabric 7 forming the upper and outer surface of the folded airbag 1 (FIGS. 3(C) and 4(C)). For this purpose, the superimposed lays of the second set of folds are turned in the direction of inwardly directed arrows 26 (FIGS. 3(B) and 4(B)). As shown, in particular, in the illustrations in FIGS. 3(A) and (B) and FIGS. 4(A) and (B), the zigzag set of folds 3 is made from top to bottom with respect to the upper part of the airbag 1 and from bottom to top with respect to the lower region of the airbag 1. Folding is orientated toward the fixing frame 4 in this embodiment.

It can be seen from the foregoing illustration that the first set of folds 2 is orientated toward the two ends of the fixing frame 4 and the second set of folds 3 toward the two longitudinal sides of the fixing frame 4. In the embodiment illustrated, the folded airbag has substantially the dimensions of the fixing frame 4 in base cross-section. In order to accommodate the stacked fold lays of the second set of folds 3 between the external piece of fabric 7 and the fixing frame 4, the lay length of the inner fold lay 13 of the second set of folds connected directly to the fixing frame 4 is substantially equal to or somewhat greater than the stack height of the remaining fold lays of the second set of folds 3. This is shown, in particular, in the illustration of the folded stack of the airbag in the illustrations in FIGS. 3(C) and 4(C). With this arrangement, the folded stacks 14, 15 of the lays of the second set of folds formed in each case between two fold lines 19 of the second set of folds are turned in in the direction of the arrows 26 so that the outer fold lay 12 of the second set of folds is supported on the fixing frame 4.

The fixing frame 4 can comprise the inlet orifice for filling the airbag. The filling gas is introduced by a gas generator, not shown, optionally via a diffuser through the orifice of the fixing frame 4 into the interior of the folded airbag 1. As a result of the special folding, a compact stacked package of the airbag 1 is obtained which unfolds rapidly when inflated, and the desired final form for obtaining the necessary restraint function is achieved, in particular on the passenger side of the vehicle.

With a flat arrangement of the folded airbag package, as desired, for example, with an airbag integrated in the dashboard, the stacked fold lays of the two crossover sets of folds are able to fill the entire available receiving compartment, optionally with a reinforcing trough (DE 197 04 684 1).

As a result of the different lengths of the upper and lower regions of the airbag 1, the lay lengths between the fold lines 19 and/or the number of fold lays in these regions can differ in order to obtain uniform stack heights of the fold stacks 14 and 15 (FIGS. 3(C) and 4(C)) in the fold stack of the airbag. As shown in FIG. 4(B), an additional fold lay 28 can be shaped directly below the piece of fabric 7 forming the upper surface of the final airbag stack in order to improve the anchoring or attachment capability of the scanning or measuring elements 17.

As the second set of folds 3 ends at the lateral boundaries of the fixing device 4 or in the vicinity thereof, as shown in the illustrations in FIGS. 3(B) and 4(B), there remains a region of the airbag with a span which corresponds substantially to the base surface of the fixing device 4 and in which the second set of folds is not shaped. This region of the airbag has only the first set of folds in the form of a bellows. As can be seen, in particular, in FIGS. 3(C) and 4(C), this region of the airbag, which comprises only the first set of folds (2), is located above the airbag stacks 14 and 15 which comprise the two sets of folds 2 and 3. The top layer of the region of the airbag provided only with the first set of folds 2 is formed by the piece of fabric 7. The scanning or measuring elements 17 are attached and anchored in anchoring points 27 preferably located in this region of the airbag comprising only the first set of folds.

Figures 5A, 5B:
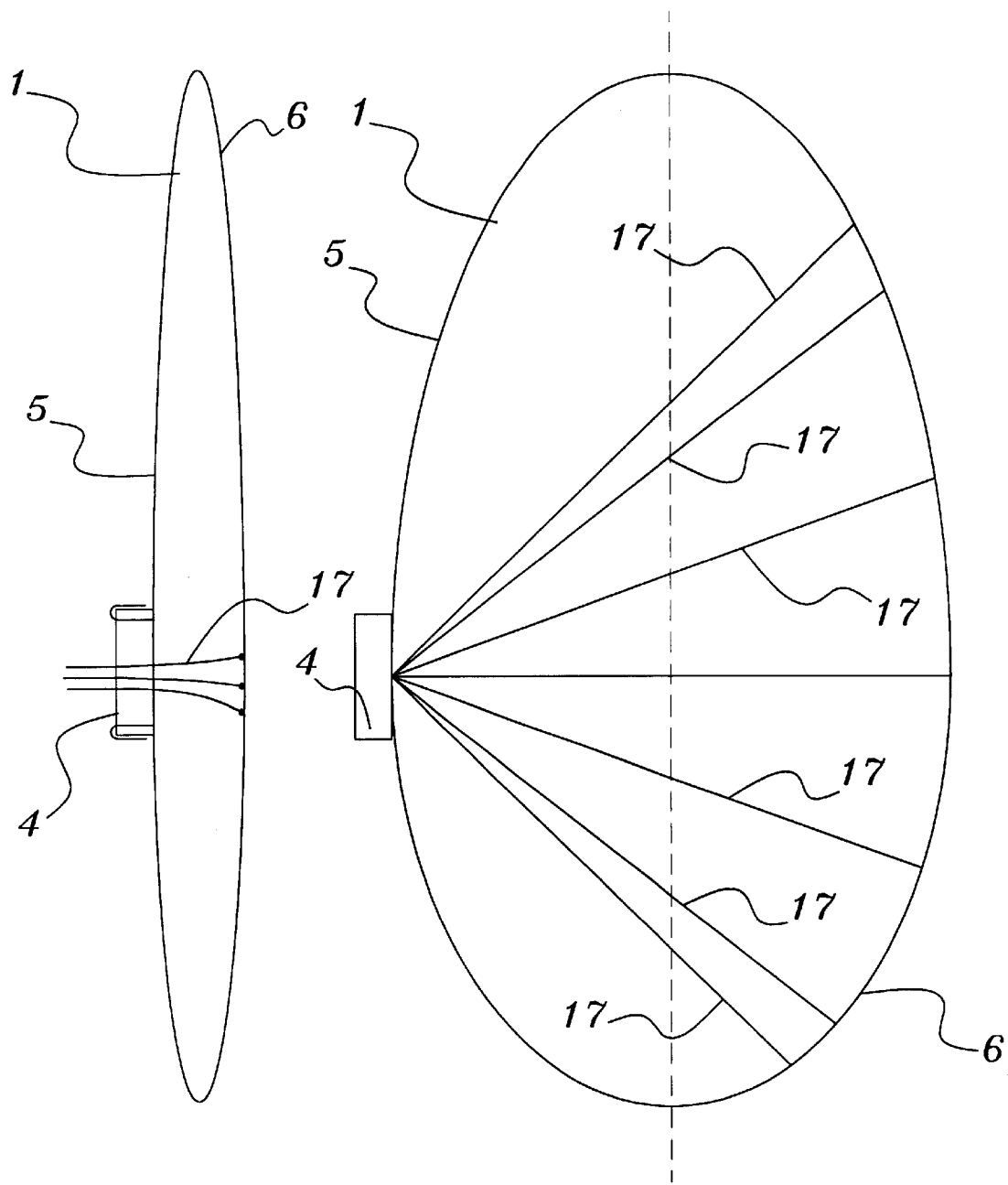
FIG. 5 shows schematically different unfolded states during inflation of the airbag with sketched scanning or measuring elements for determining the advance movement, in particular of the front panel of the airbag.
Figure 6A:
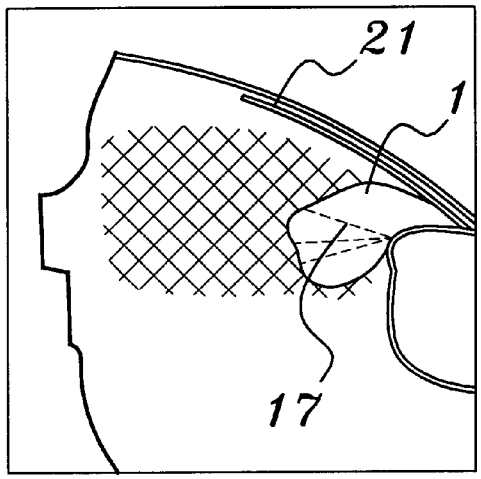
FIG. 6 shows various unfolded states of the airbag during inflation in illustrations (A) to (D).
Figure 6B:
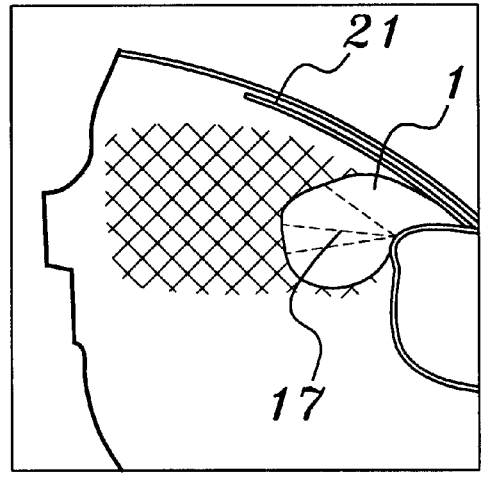
Figure 6C:
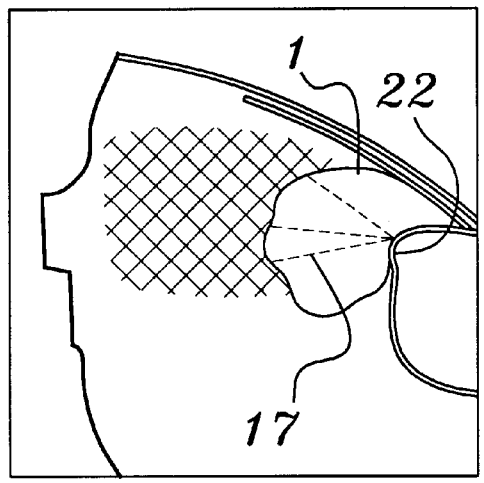
Figure 6D:
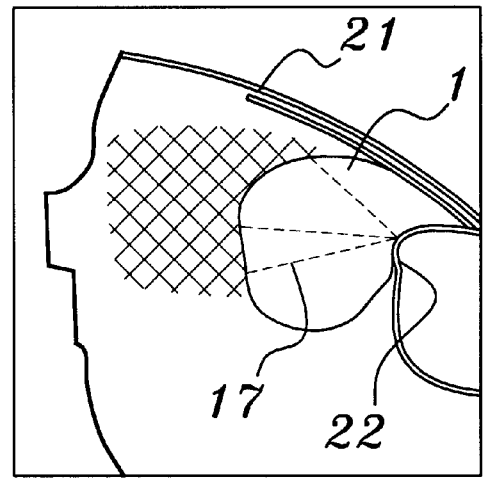

As a result of the special folding technique, a passage for one or more scanning or measuring elements 17 is created in the interior of the airbag stack, as shown in FIGS. 3(C) and 4(C). The scanning or measuring elements 17 can be guided in a rectilinear and unimpeded manner from their anchoring points 27 on the interior of the airbag to a scanning or measuring point. The measuring point is not shown in detail in the figures, but can be arranged at a suitable point and can be designed and operate, for example, in the manner known from DE 196 11 384 A1. Owing to the unimpeded, in particular rectilinear guidance of the measuring element or the measuring elements 17 from the scanning or measuring point to the anchoring points 27, precise information about the length of advance movement of the unfolding airbag 1 is obtained. The anchoring points 27 are preferably provided on the internal fold lines 9 of the first set of folds 2 and can be provided at crossover points with the fold lines 19 of the second set of folds 3 or at the internal fold line of the additional fold lay 28. The position of the anchoring points is selected such that specific regions of the front surface of the airbag moving into the passenger space can be monitored with respect to unimpeded advance movement as it unfolds. To this end, for example, a measuring arrangement and evaluating device can be provided, as known from DE 196 11 384 A1. As shown in FIGS. 5 and 6, a measuring arrangement is formed at the transition from the stacked form into the unfolding form of the airbag during inflation, by means, for example, of rectilinearly extending measuring elements which can be flexible and are subjected to a specific pulling action for the length of advance movement of the unfolding airbag 1 in the regions which are desired to be monitored in each case and are preferably located at the front surface of the airbag. The timing of the unfolding process is shown schematically in illustrations (A) to (D) in FIG. 6. These illustrations, as well as illustrations (A) and (B) in FIG. 5 show that exact detection of the length of advance movement unimpeded by the folding of the airbag is achieved by means of simple thread or strip-shaped measuring elements or similar measuring elements. The special folding allows loop-free guidance of the measuring elements 17 within the airbag stack, as shown in particular in FIGS. 3(C) and 4(C). The anchoring points 27 representing the measuring points of the length of advance movement can be selected as a function of the different types of vehicle according to the design of airbag. In particular, therefore, circumstances where the passenger is out-of-position can be detected and the gas filling controlled accordingly, as known, for example, from DE 195 11 384 A1 or described in DE 196 04 684 A1.

Furthermore, as shown schematically in FIG. 1, tear seams 25 can be provided which can be laid along specific fold lines 9 and 19 depending on the various types of airbag in different vehicles and on the desired manner of unfolding.

Many changes and modifications in the above-described embodiments of the invention can, of course, be carried out without departing from the scope thereof. Accordingly, that scope is intended to be limited only by the scope of the appended claims.

What is claimed is:

1. An airbag which is folded in the resting state comprising two regions with different folding, wherein, in one region in a front part of the airbag having a span corresponding substantially to the base cross-section of a fixing device to which at least one scanning element is connected, said scanning cement on inflation of the airbag providing a measurement value corresponding to the distance the airbag front part has moved, a bellows is formed by a first set of folds, in which fold lays directed toward on another of, in each case, two internal fold flanks converging in the fold lines are formed on two opposing sides of the airbag and, in the other region, a part of the bellows formed by the first set of folds is folded with a zigzag set of folds orientated perpendicularly to the first set of folds at the other two sides of the airbag to form two stacks which lie side by side and are arranged between the bellows in the first region and the fixing device and in that at least one scanning element is guided between the two stacks of the second region and the internal fold lines of the first region, only the first set of folds has a span corresponding substantially to the base cross-section of the fixing device.

2. Airbag according to claim 1 wherein the second set of folds, the length of lay of a fold lay connected directly to the fixing frame corresponds substantially to the stack height of the two stacks.

3. The airbag according to claim 1 further comprising a fixing device to which the airbag is fastened, the fixing device is designed as a fixing frame of rectangular form and the first set of folds is provided at the two narrow sides and the second set of folds at the two long sides of the fixing device.

4. The airbag according to claim 1 wherein each case outer fold lays of the second set of folds rest on the fixing device as a lower layer of the respective fold stack of the second set of folds.

5. The airbag according to claim 1 wherein the number and/or lengths of the fold lays of the two fold stacks differ.

6. The airbag according to claim 1 wherein the anchoring point of the scanning element lies within the upper part of the airbag on an internal fold line of the first set of folds.

7. The airbag according to claim 1 wherein at least one scanning element is connected to a piece of fabric forming the upper surface of the folded airbag.

8. The airbag according claim 1 wherein for the intended manner of unfolding during inflation of the airbag, the fold lays of the two folds are connected by tear seams, in particular in the region of the fold lines.

9. The airbag according to claim 3 wherein the fixing device designed as a fixing frame comprises a filling orifice through which the airbag is inflated as it unfolds.

10. The airbag according to claim 1 wherein the region of the airbag comprising only the first set of folds is arranged between the two fold stacks comprising the two sets of folds and the piece of fabric forming the top of the folded airbag stack.

11. Airbag according to claim 7 further comprising an additional fold lay below the piece of fabric forming the upper surface of the folded airbag.

* * * * *